United States Patent
Smith et al.

(10) Patent No.: US 9,844,834 B2
(45) Date of Patent: Dec. 19, 2017

(54) MITIGATING DISTORTION OF COATED PARTS DURING LASER DRILLING

(71) Applicant: UNITED TECHNOLOGIES CORPORATION, Farmington, CT (US)

(72) Inventors: Richard L. Smith, East Hartford, CT (US); Alan C. Barron, Jupiter, FL (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 576 days.

(21) Appl. No.: 14/518,563

(22) Filed: Oct. 20, 2014

(65) Prior Publication Data
US 2015/0298261 A1    Oct. 22, 2015

Related U.S. Application Data

(60) Provisional application No. 61/893,575, filed on Oct. 21, 2013.

(51) Int. Cl.
| | |
|---|---|
| *B23K 26/38* | (2014.01) |
| *B23K 26/382* | (2014.01) |
| *B23K 26/06* | (2014.01) |
| *B23K 26/60* | (2014.01) |
| *B23K 101/00* | (2006.01) |
| *B23K 101/34* | (2006.01) |

(52) U.S. Cl.
CPC ........ *B23K 26/389* (2015.10); *B23K 26/0617* (2013.01); *B23K 26/60* (2015.10); *B23K 2201/001* (2013.01); *B23K 2201/34* (2013.01)

(58) Field of Classification Search
CPC .... B23K 26/381; B23K 26/409; B23K 26/02; B23K 26/0617; B23K 26/60; B23K 26/389; B23K 2201/001; B23K 2201/34
USPC ............. 219/76.14, 121.64, 121.66, 121.69, 219/121.72, 443.1, 647
See application file for complete search history.

(56) References Cited

U.S. PATENT DOCUMENTS

| | | | | |
|---|---|---|---|---|
| 4,504,730 | A * | 3/1985 | Shimizu | H01L 21/2686 118/725 |
| 6,288,873 | B1 * | 9/2001 | Lundquist | G11B 21/21 360/234.6 |
| 2004/0009649 | A1 * | 1/2004 | Kub | B82Y 30/00 438/459 |
| 2007/0257085 | A1 * | 11/2007 | Fukuda | H01L 21/67005 228/101 |
| 2009/0314754 | A1 * | 12/2009 | Kosmowski | B23K 26/10 219/121.72 |
| 2010/0078418 | A1 * | 4/2010 | Lei | B23K 26/18 219/121.72 |
| 2011/0000898 | A1 * | 1/2011 | Rumsby | B23K 26/032 219/121.72 |

* cited by examiner

*Primary Examiner* — Thien S Tran
(74) *Attorney, Agent, or Firm* — Cantor Colburn LLP

(57) ABSTRACT

A method for drilling holes in a part includes positioning the part relative to a laser source, applying a first stress to the part, and applying a laser from the laser source to the part to drill a hole therein, wherein the first stress which is present during the application of the laser counteracts a second stress induced by the application of the laser.

13 Claims, 3 Drawing Sheets

US 9,844,834 B2

MITIGATING DISTORTION OF COATED PARTS DURING LASER DRILLING

CROSS-REFERENCE TO RELATED APPLICATIONS

This application claims priority to U.S. Provisional Application No. 61/893,575 filed on Oct. 21, 2013 and titled Mitigating Distortion of Coated Parts During Laser Drilling, the disclosure of which is hereby incorporated by reference in its entirety.

BACKGROUND

The present disclosure relates generally to metallic part processing, and, more particularly, to a laser drilling process of metallic parts.

Laser drilling of cylindrical holes generally occurs through melting and vaporization of the work piece material through absorption of energy from a focused laser beam. As a side effect, laser drilling may cause residual stresses and distortion of drilled parts. Both the residual stresses and the distortion are driven by local thermal gradients and their associated gradients in substrate thermal expansion and transient metallic properties. Distortion due to laser drilling is often imperceptible but can be significant in certain structures, in which case a warp will be formed that may cause failure of the structure, failure of associated coatings, or result in a final part or structure that does not satisfy dimensional requirements.

Accordingly, what is desired is a laser drilling method that mitigates distortion without significantly impacting production feasibility and effectiveness.

SUMMARY

Disclosed and claimed herein is a method for drilling one or more holes in a part. In one embodiment a method includes positioning the part relative to a laser source, applying a first stress to the part, and applying a laser from the laser source to the part to drill a hole therein, wherein the first stress which is present during the application of the laser counteracts a second stress induced by the application of the laser. In one embodiment, the first stress is introduced by pre-bowing the part prior to the application of the laser. In one embodiment, the aforementioned stress is introduced by applying a load at the part while applying the laser. In one embodiment, the first stress is introduced by applying heat from an opposite side of the part while applying the laser.

Other aspects, features, and techniques will be apparent to one skilled in the relevant art in view of the following detailed description of the embodiments.

BRIEF DESCRIPTION OF THE DRAWINGS

The drawings accompanying and forming part of this specification are included to depict certain aspects of the present disclosure. A clearer conception of the present disclosure, and of the components and operation of systems provided with the present disclosure, will become more readily apparent by referring to the exemplary, and therefore non-limiting, embodiments illustrated in the drawings, wherein like reference numbers (if they occur in more than one view) designate the same elements. The present disclosure may be better understood by reference to one or more of these drawings in combination with the description presented herein. It should be noted that the features illustrated in the drawings are not necessarily drawn to scale.

DESCRIPTION

One aspect of the disclosure relates to a laser drilling process. In one embodiment, a method is provided to significantly reduce laser induced distortion and/or stress in processed parts. Embodiments of the present disclosure will be described hereinafter with reference to the attached drawings.

According to one embodiment of the present disclosure, laser drilling as discussed herein may be applied to manufacturing of metallic exhaust liners of aircraft which are coated with ceramic-based thermal barrier and/or other protective coatings. In particular, laser drilling of multi-hole film cooling patterns is used for surface cooling of these liners. One of the advantages of laser drilling is its ability to drill small and closely space cylindrical holes at 15-90 degree to the surface with high efficiency. In multi-hole film cooling, small (0.01-0.2 inch) closely spaced holes (e.g., from a few to more than 50 holes per square inch) are used to distribute cooling air and establish a film.

Figure 1A:
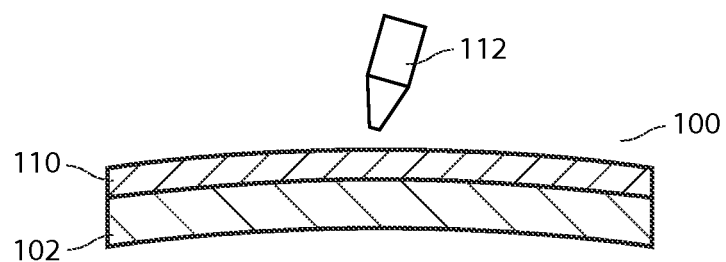
FIGS. 1A and 1B are cross-sectional views of a coated thin sheet structure before and after laser drilling according to an embodiment of the present disclosure.
Figure 1B:
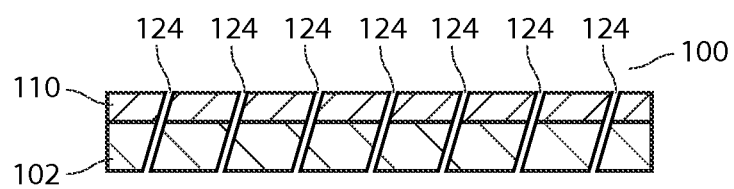

FIGS. 1A and 1B are cross-sectional views of a thin sheet structure 100 before and after a laser drilling process according to an embodiment of the present disclosure. The thin sheet structure 100 may be a section of a jet engine exhaust liner. Referring to FIG. 1A, the thin sheet structure 100 comprises a metal substrate 102, which is coated with a ceramic-based coating 110 on one side. In addition, a bond coat layer (not shown in FIG. 1A) between the substrate 102 and the coating 110 may be employed to promote or enhance adhesion of the coating 110 to the substrate 102. In one embodiment, the thin sheet structure 100 is stressed before undergoing laser drilling, to form a bow shape, or in other words, is pre-bowed in a manner that will oppose or accommodate a subsequent laser-induced distortion. As shown in FIG. 1A, a laser head 112 for drilling is pointed at the coated side 110 of the thin sheet structure 100, which is convexly bowed toward the laser head 112. The laser head 112 is then activated in a controlled manner to drill a hole through the thin sheet structure 100. The control can be in such aspects as energy level, pulsation and duration of the laser. It is apparent that the laser head 112 can drill either vertically or at an angle as shown in FIG. 1A.

Referring to FIG. 1B, a plurality of cooling holes 124 through the thin sheet structure 100 are drilled by the laser head 112. In one embodiment, the thin sheet structure 100 may be bowed to offset laser-induced distortion, such that the drilled thin sheet structure 100 returns to its original geometry (flat) after the laser drilling as shown in FIG. 1B. Here the geometry of the thin sheet structure 100 refers to a geometric contour of the thin sheet structure 100 in its elongated direction.

According to one embodiment, the thin sheet structure may be bowed to introduce residual tensile stress to the coating 110 which will aid in accommodating the compressive load induced during laser processing. Therefore, the pre-bow operation should be performed in a controlled manner and within the limits of the tensile capabilities of coating 110, so that the coating durability will not be compromised. The pre-bow amount can be determined empirically or through computer simulations for a particular thin sheet structure.

Figure 2:
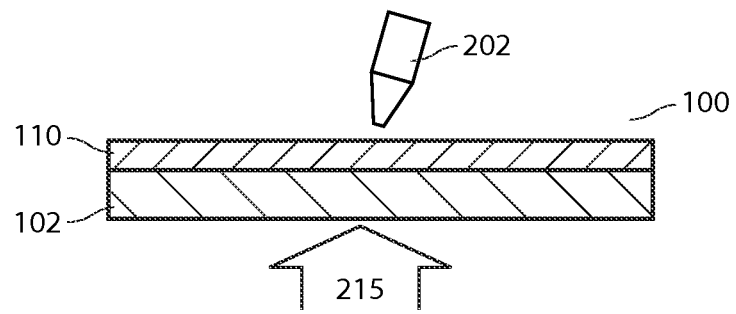
FIG. 2 is a diagram illustrating a laser drilling process according to another embodiment of the present disclosure.

FIG. 2 is a diagram illustrating a laser drilling process according to another embodiment of the present disclosure. A thin sheet structure 200 remains in its originally flat geometric form, and comprises the substrate 102 and the coating 110. A laser head 202 is pointed at the coated side 110 of the thin sheet structure 100 for drilling cooling holes. While the drilling is performed, a load 215 is simultaneously applied on the substrate side 102 pushing the thin sheet structure 100 upward. The load 215 is designed to offset the thermal load induced by the laser drilling operation, such that distortion would be minimized. This can be accomplished through the use of a fixture that can apply the load 215 to the thin sheet structure 100. The load 215 can be varied throughout the durations of laser drilling and subsequent cooling.

Although the original geometric form of the thin sheet structure 200 is exemplary illustrated as flat, it should be appreciated that the presently disclosed laser drilling process can also be applied to other geometric forms. In case of a jet engine exhaust liner, the original geometric form may be curved.

In a certain embodiment, an applied load, such as the load 215, would tend to bend the thin sheet structure 100 convexly toward the coated side 110 to offset the laser-induced load. In this case, however, an initial elastic preload moment may be adequate to avoid laser induced distortion. The load 215 and the initial elastic preload moment may be adequately determined through empirical optimization trials, potentially supported by computational modeling on a particular part or assembly.

Figure 3:
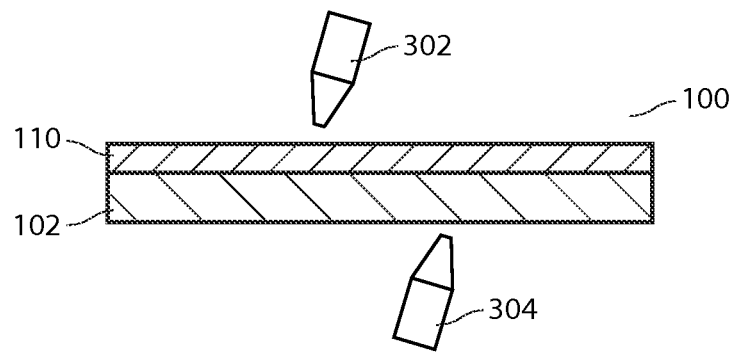
FIG. 3 is a diagram illustrating a laser drilling process according to yet another embodiment of the present disclosure.

FIG. 3 is a diagram illustrating a laser drilling process according to yet another embodiment of the present disclosure, in which the goal of mitigating the net and maximum distortion caused by the laser drilling process is achieved through drilling from both sides of the thin sheet structure 200 when a circumstance allows. In one embodiment, a laser head 302 may perform drilling from the coated side 110, and another laser head 304 performs drilling from the substrate side 102. In a simple implementation, approximately one half of the cooling holes (not shown in FIG. 3, but are similar to the holes 124 in FIG. 1B) would first be drilled by the laser head 302 and the remaining half of the holes would be drilled by the laser head 304. The maximum distortion/deflection encountered with this approach would then be approximately one half of that encountered with drilling from only one side of the thin sheet structure 200. In certain embodiments, one quarter of the holes may be drilled from one side, then another quarter of the holes from the other side, and so on. In this way, the maximum distortion encountered may be reduced to approximately twenty five percent of that encountered with drilling from only one side of the thin sheet structure 100.

Although two laser heads 302 and 304 are illustrated in FIG. 3, the thin sheet structure 200 may be rotated after finishing drilling from one side for drilling from the other side, then only one laser head is needed. When two laser heads are separately used on opposite sides, they can be placed close to each other and simultaneously perform drilling.

Although each embodiment of the present disclosure are separately depicted above, it should be appreciated that a combination of stresses may be applied. For instance, when laser drilling a first number of holes from a top side of a thin sheet structure, a load is applied on the bottom side during the laser drilling. Then flipping over the thin sheet structure for drilling a second number of holes from the bottom side, this time the same load can be applied on the top side then.

It should also be realized that the pre-bowing, the applying a load and the laser drilling from both sides of a metallic part as described above all introduce stress in the metallic part, and that stress is intended to counteract a stress induced by laser drilling. As a result, distortion of the metallic part may be avoided after laser drilling according to embodiments of the present disclosure.

Figure 4:
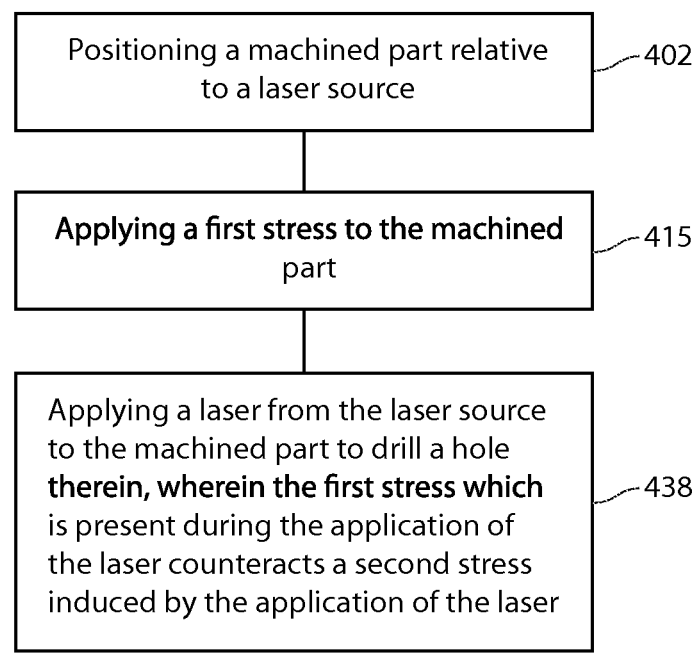
FIG. 4 is a flow-chart diagram illustrating a laser drilling process according to embodiments of the present disclosure.

FIG. 4 is a flow-chart diagram illustrating a laser drilling process according to embodiments of the present disclosure. The laser drilling process may be initiated by positioning a metallic part relative to a laser source in step 402. Next is to apply a first stress to the metallic part in step 415. Then apply a laser from the laser source to the metallic part to drill a hole therein in step 438, wherein the first stress which is present during the application of the laser counteracts a second stress induced by the application of the laser.

It should be apparent that the presently disclosed laser drilling process is not limited to drilling structures with just two layers of materials, and the materials are not limited to just the exemplary metal substrate coated with a ceramic-based coating. It should be apparent that the presently disclosed laser drilling process can be applied to any manufacturing process where reduced distortion of the metallic part is desired.

While this disclosure has been particularly shown and described with references to exemplary embodiments thereof, it shall be understood by those skilled in the art that various changes in form and details may be made therein without departing from the spirit of the claimed embodiments.

What is claimed is:

1. A method for drilling one or more holes in a jet engine exhaust liner, the method comprising:
    positioning the jet engine exhaust liner relative to a laser source, wherein the jet engine exhaust liner includes a metal substrate coated with a ceramic-based coating and the laser source is pointed at the ceramic-based coating;
    applying a first stress to the jet engine exhaust liner; and
    applying a laser from the laser source to the jet engine exhaust liner to drill a hole through the ceramic-based coating and the metal substrate,
    wherein the first stress is applied by applying a load to the jet engine exhaust liner while applying the laser,
    wherein the load is varied during the application of the laser and during subsequent cooling of the jet engine exhaust liner after application of the laser.

2. The method of claim 1, wherein the first stress is present during the application of the laser, and the first stress counteracts a second stress induced by the application of the laser.

3. The method of claim 1, wherein the first stress is applied by pre-bowing the jet engine exhaust liner prior to the application of the laser.

4. The method of claim 1, wherein the applying the first stress includes applying heat to the jet engine exhaust liner, wherein the heat is applied on a side opposite to the side that faces the laser source.

5. The method of claim 4, wherein the heat is generated by laser drilling performed prior to the application of the laser.

6. The method of claim 4, wherein the heat is generated by laser drilling performed simultaneous to the application of the laser.

7. A method for drilling one or more holes in a jet engine exhaust liner, the method comprising:
- positioning the jet engine exhaust liner relative to a laser source, wherein the jet engine exhaust liner includes a metal substrate coated with a ceramic-based coating and the laser source is pointed at the ceramic-based coating;
- pre-bowing the jet engine exhaust liner; and
- applying a laser from the laser source to the pre-bowed jet engine exhaust liner to drill a hole through the ceramic-based coating and the metal substrate,
- wherein the pre-bowing opposes a stress induced by the application of the laser in the jet engine exhaust liner
- wherein the bow is varied during the application of the laser and during subsequent cooling of the jet engine exhaust liner after application of the laser.

8. The method of claim 7, wherein an amount of the pre-bowing is predetermined so that the jet engine exhaust liner is not over-stressed.

9. A method for drilling one or more holes in a jet engine exhaust liner, the method comprising:
- positioning the jet engine exhaust liner relative to a laser source, wherein the jet engine exhaust liner includes a metal substrate coated with a ceramic-based coating and the laser source is pointed at the ceramic-based coating;
- applying a load at the jet engine exhaust liner; and
- applying a laser from the laser source to the jet engine exhaust liner to drill a hole through the ceramic-based coating and the metal substrate,
- wherein the load is present during the application of the laser and opposes a stress induced by the application of the laser in the jet engine exhaust liner,
- wherein the load is varied during the application of the laser and during subsequent cooling of the jet engine exhaust liner after application of the laser.

10. The method of claim 9, wherein the load is varied during a period of the application.

11. A method for drilling one or more holes in a jet engine exhaust liner, the method comprising:
- positioning a first side of the jet engine exhaust liner relative to a laser source, wherein the jet engine exhaust liner includes a metal substrate coated with a ceramic-based coating and the laser source is pointed at the ceramic-based coating;
- applying heat from a second side of the jet engine exhaust liner, the second side being opposite to the first side; and
- applying a laser from the laser source to the position of the jet engine exhaust liner to drill a hole through the ceramic-based coating and the metal substrate,
- wherein the heat is present during the application of the laser.

12. The method of claim 11, wherein the heat is generated by a laser drilling performed prior to the application of the laser.

13. The method of claim 11, wherein the heat is generated by a laser drilling performed simultaneous to the application of the laser.

* * * * *